Patented Feb. 2, 1932

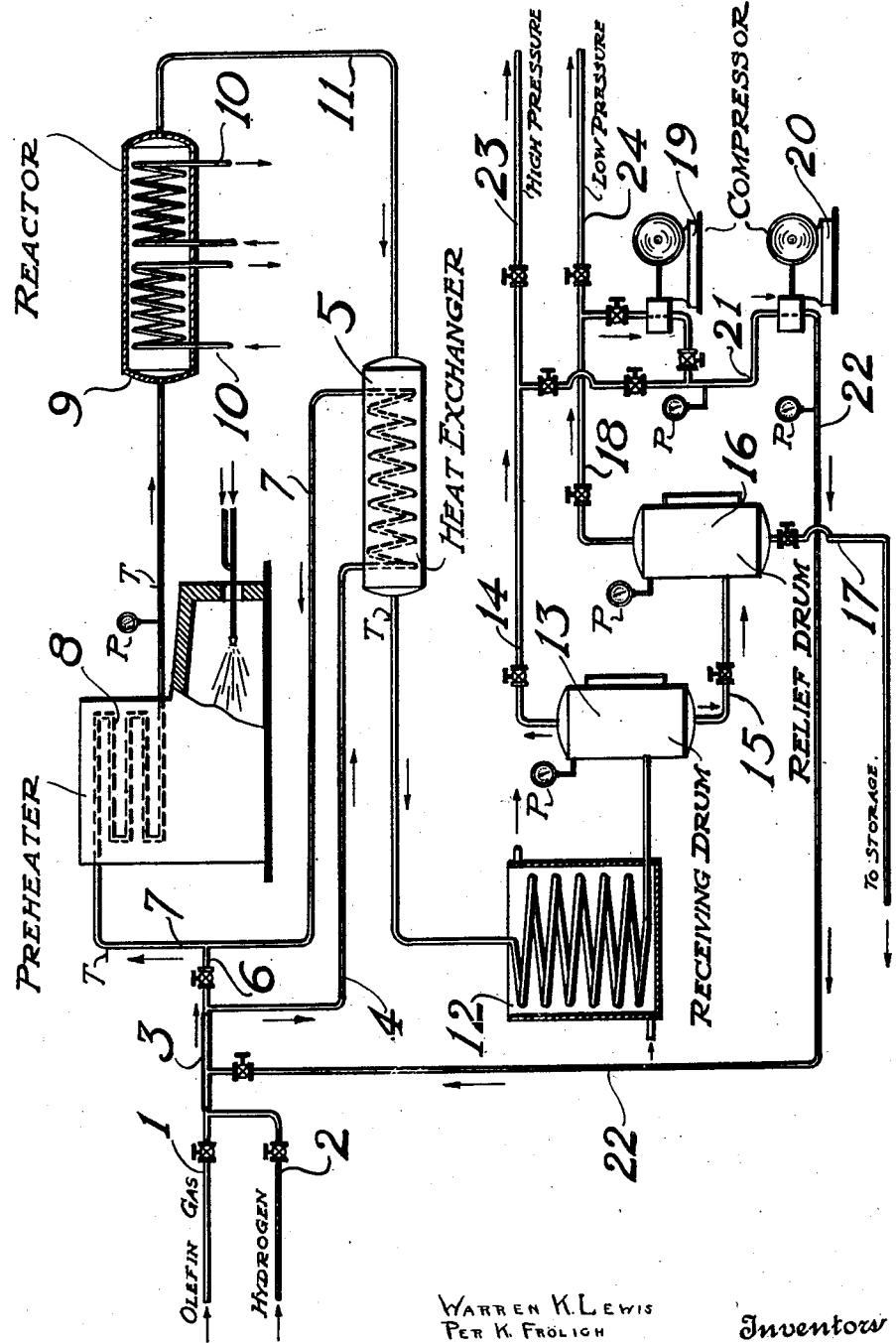

1,843,880

UNITED STATES PATENT OFFICE

WARREN K. LEWIS, OF NEWTON, AND PER K. FROLICH, OF CAMBRIDGE, MASSACHUSETTS, AND WILLARD C. ASBURY, OF BATON ROUGE, LOUISIANA, ASSIGNORS TO STANDARD OIL DEVELOPMENT COMPANY, A CORPORATION OF DELAWARE

PROCESS FOR THE PRODUCTION OF GASOLINE FROM GASEOUS AND LOW BOILING LIQUID HYDROCARBONS

Application filed September 8, 1927. Serial No. 218,154.

The present invention relates to the production of valuable liquid hydrocarbons from gaseous or low boiling liquid hydrocarbons and more specifically comprises a process for converting olefins, either gaseous or light liquids, into higher boiling liquids suitable for motor fuels and the like. Our invention will be fully understood from the following description and the drawing, which illustrates an apparatus suitable for the purpose.

The drawing is a semi-diagrammatic view in elevation of an apparatus suitable for our process and indicates the course of the gases through the process.

It has been long realized that olefins such as ethylene, propylene and the like could be polymerized under heat and pressure to form higher boiling, normally liquid products. These reactions are, however, accompanied by copious deposition of carbon or coky materials and by the formation of saturated gases such as methane and ethane. It has also been found that the liquid yields are not large and that the liquid is a tarry, high boiling substance not suitable for motor fuel and the other uses of gasoline and the like.

We have discovered that gaseous and light liquid olefins and the like unsaturated hydrocarbons may be polymerized under certain conditions involving hydrogenation, whereby large yields of liquid may be produced boiling within the range of commercial gasoline and without the attendant losses due to formation of excessive quantities of saturated gas and deposition of carbon.

Referring to the drawing, the reference character 1 designates an inlet pipe through which a gaseous olefin or mixture of olefins is fed under high pressure. A hydrogen containing gas is fed under approximately equal pressure through line 2 and is mixed with the olefin in a mixing pipe 3. The mixture is conveyed to a heat exchanger 5 by pipe 4 and thence by pipe 7 to a preheating coil 8, which may be directly fired, as shown, or heated indirectly by steam or electricity. A by-pass line 6 is provided so that a part of the gas mixture may be shunted around the heat exchanger 5. The gas mixture is discharged from the coil into a reactor 9 which may be of any suitable design adapted to withstand the pressure. Preferably, the reactor is a heavy steel shell provided with temperature regulating coils 10 distributed carefully in the body of the reactor. The reactor may be otherwise empty but we prefer to fill it partially with a contact substance of high heat conductivity and of a metallic character in the form of small shot, copper shot being preferred. Gases leaving the reactor pass to the heat exchanger 5 by line 11 and thence to a condenser 12 wherein the normally liquid products are condensed. Gas and liquid, still preferably under high pressure, are emptied into a drum 13. Gas is removed from the top by line 14, while liquid is conducted by valved pipe 15 to relief drum 16 under lower pressure, which allows dissolved gases to separate from the liquid which is discharged to storage (not shown) by line 17.

Low pressure gas is withdrawn from drum 16 by line 18, is compressed by compressor 19 and mixed with gas from drum 13 in a pipe 21 which conducts the mixture to a second compressor 20. The gas mixture is compressed by 20 and returned to the mixing pipe 3 by line 22 and thus may be recirculated through the system. High and low pressure gases may be bled from the system by pipes 23 and 24. When the olefin mixture is liquid under the pressure it has been found preferable to preheat it separately and mix the vaporized liquid with the hydrogen-containing gas, as will be readily understood. Pressure gages are indicated by "P" and thermometers by "T".

In the operation of our process, we have found that the polymerization of olefins, either a pure olefin or a mixture of two or more, produces liquids of a higher degree of saturation as indicated by bromine numbers if the polymerization is carried out under hydrogenating conditions. The pressure is in excess of 1,000 lbs. per square inch, and is preferably between 2,000 and 3,500 lbs. per square inch. Temperature is as high as may be maintained without excessive carbon deposition and it is desirable to limit closely extremes of temperature in the reactor. The preferred temperatures lie within the range between 300 and 600° C. and the reactor is preferably filled with copper or other metal shot, although an empty reactor may be used. Decrease of the proportion of hydrogen in the inlet mixture results in increased bromine numbers and heavier products. We maintain the partial pressure of the hydrogen above 600 lbs. per square inch and prefer to operate with a partial pressure of 900 to 1,500 lbs. per square inch. Increased rate of flow of gases through the reactor increases the yield of liquid products and we prefer to maintain the rate approximately between limits of 2 and 6 liters per hour per cubic centimeter of free reactor volume, measuring the volume of gas at normal pressure and temperature. We have found that inert gases such as nitrogen and saturated hydrocarbons, either gaseous or normally liquid, are desirable if present in a limited quantity, preferably below 20%.

As examples of our process, the following illustrative runs are given.

1. A gas mixture of the following composition was used as the feed:

|  | Per cent |
|---|---|
| $C_2H_4$ | 49.4 |
| $H_2$ | 37.8 |
| $N_2$ | 11.1 |
| $C_2H_6$ | 1.7 |

The gas was passed once through a reactor filled with copper short under pressure of 3,000 lbs. per square inch and at a temperature of approximately 495° C. The rate of flow was about 3 liters (normal temperature and pressure) per hour per cubic centimeter of free reactor volume and approximately 100 cubic centimeters of a liquid of the following characteristics was obtained from 344 liters of gas:

| Specific gravity | .726 at 20° C. |
|---|---|
| Initial boiling point | 41° C. |
| Per cent distilled at 100° C | 26 |
| Per cent distilled at 150° C | 60 |
| Per cent distilled at 225° C | 86 |

The bromine number was 78.5 determined by the method of A. W. Francis, (Ind. Eng. Chem. 18, (1926) 821. The run was continued for about 15 hours and only a small deposit of carbon was found in the reactor.

2. A mixture of 57.2 propylene and hydrogen was passed through a copper filled reactor at a rate of 4 liters per hour per cubic centimeter of free reactor volume. Pressure was 3,000 lbs. per square inch and temperature approximately 565° C. Approximately 115 cubic centimeter of liquid was obtained by a single passage of 200 liters of the mixture. The liquid shows the following characteristics:

| Specific gravity | .783 at 20° C. |
|---|---|
| Bromine number | 60.9 |
| Initial boiling point | 60° C. |
| Per cent distilled at 100° C | 24 |
| Per cent distilled at 150° C | 58 |
| Per cent distilled at 225° C | 80 |
| Final boiling point | 275° C. |

3. A mixture of butylene and hydrogen was fed through the reactor as in example 2 under pressure of 3,000 lbs. per square inch and at about 556° C., the rate of flow being about 5 liters per hour per cubic centimeter of free reactor volume. A large yield of liquid was obtained which boiled between 28° C. and 265° C. and had a specific gravity of .770 at 20° C.

4. A mixture of ethylene, propylene, butylene, hydrogen and nitrogen was passed through the reactor held at 3,000 lbs. per square inch and at about 570° C., under conditions of hydrogenation. The yield of liquid was high and the product boiled between 45° C. and 272° C.

Our process may be employed to polymerize and hydrogenate pure olefins or mixtures of olefins or similar unsaturated hydrocarbons in a pure state or in admixture with olefins and other hydrocarbons. Such mixtures occur in the cracked gas from oil cracking systems or in the gas from the distillation of coal and the like.

We claim:

1. A process for producing hydrocarbons containing a greater number of carbon atoms from lower molecular weight unsaturated hydrocarbons comprising polymerizing said unsaturates under hydrogen pressure of at least 600 lbs. per square inch, at temperatures between the limits of 300 and 600° C. and in the absence of substantial quantities of carbon oxides.

2. A process according to claim 1, in which the total pressure is in excess of 2,000 lbs. per square inch.

3. A process for producing liquid hydrocarbons from normally gaseous olefins, comprising passing the gas in admixture with hydrogen but substantially free of oxides of carbon through a reaction zone maintained at pressure in excess of 1,000 lbs. per square inch and at a temperature between the limits of 300 and 600° C. and separating normally liquid hydrocarbons from residual gas.

4. A process according to claim 3, in which the rate of flow of gas through the reaction zone is in excess of 2 liters per hour per cubic centimeter of free volume as described.

5. A process according to claim 3, in which the rate of flow of gas is between the limits of 2 and 6 liters per hour per cubic centimeter of free reaction space.

6. A process according to claim 3, in which inert gas is admixed with olefins and hydrogen.

7. A process according to claim 3, in which a contact material of high heat conductivity is provided in the reaction zone.

8. A process according to claim 3, in which a contact material of metallic character is provided in the reaction zone.

9. A process according to claim 3, in which a contact material comprising copper shot is provided in the reaction zone.

10. A process for producing liquid hydrocarbons boiling within the range of gasoline from a mixture containing normally gaseous olefins, comprising passing said gas in admixture with hydrogen of commercial purity through a reaction zone maintained at a pressure between about 1000 and 3500 lbs. per square inch and at temperatures between about 300 and 600° C., condensing and separating normally liquid products from residual gas.

11. A process according to claim 10, in which the gas is preheated before passage through the reaction zone and in which uncondensed gas is returned to the reaction zone.

12. A process according to claim 10 in which the partial pressure of hydrogen is approximately 75% of the partial pressure of the unsaturated hydrocarbons.

13. A process for producing hydrocarbons of a greater number of carbon atoms from lower molecular weight unsaturated hydrocarbons which comprises subjecting such unsaturates to the action of heat and hydrogen in absence of substantial quantities of carbon oxides at a temperature between the approximate limits of 300 and 600° C. and at a total pressure between 1000 and 3500 lbs. per square inch, adjusting hydrogen pressure, time, and temperature whereby the major portion of the liquid product boils below about 225° C.

14. A process for producing liquid hydrocarbons boiling within the range of gasoline from lower molecular weight unsaturated hydrocarbons containing a smaller number of carbon atoms which comprises subjecting such unsaturates to the action of heat and hydrogen of commercial purity at a temperature between the approximate limits of 300 and 600° C. and at a total pressure between 1000 and 3500 lbs. per square inch, adjusting hydrogen pressure, time and temperature whereby the formation of tarry material or coke is substantially completely prevented.

WARREN K. LEWIS.
PER K. FROLICH.
WILLARD C. ASBURY.